G. A. HEIMBUCHER.
APPARATUS FOR TREATING OIL BEARING SHALE.
APPLICATION FILED SEPT. 3, 1918.
1,421,228.
Patented June 27, 1922.
7 SHEETS—SHEET 7.
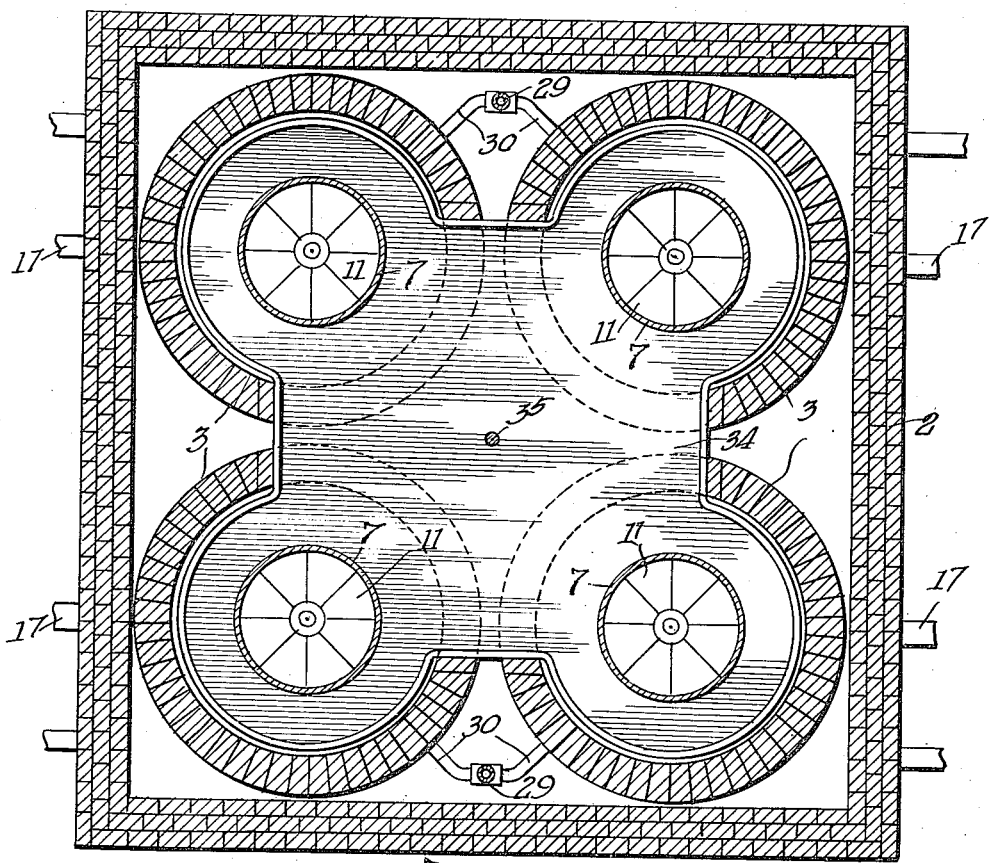
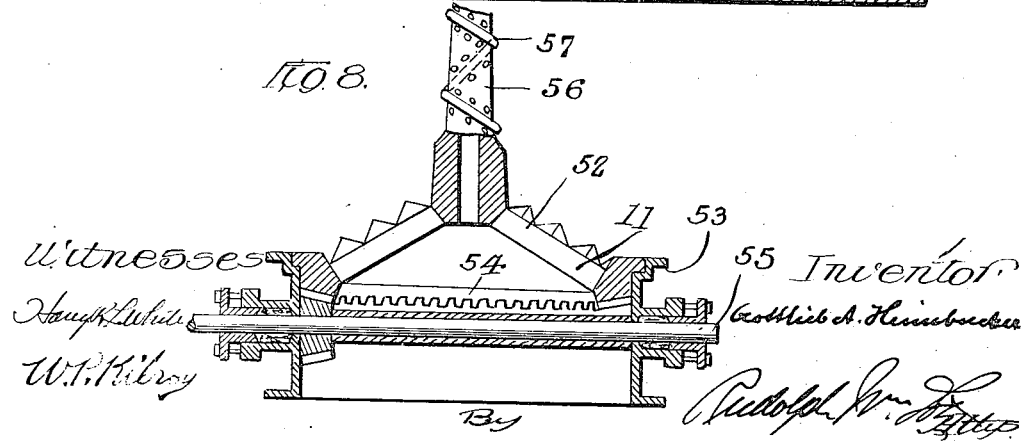

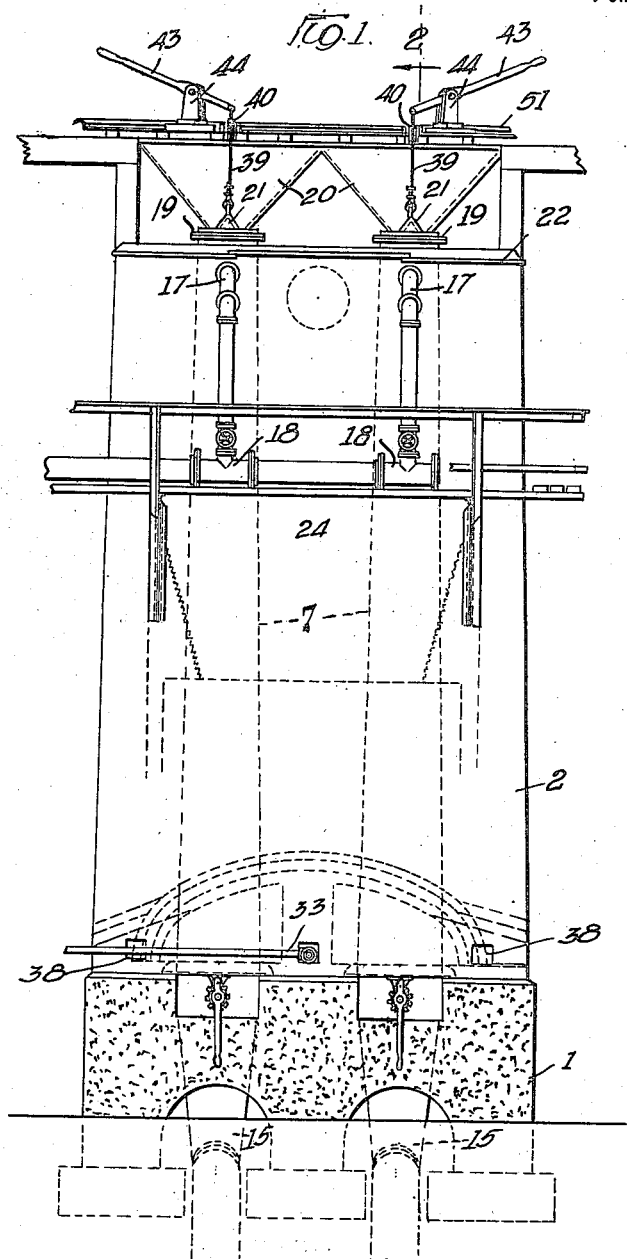

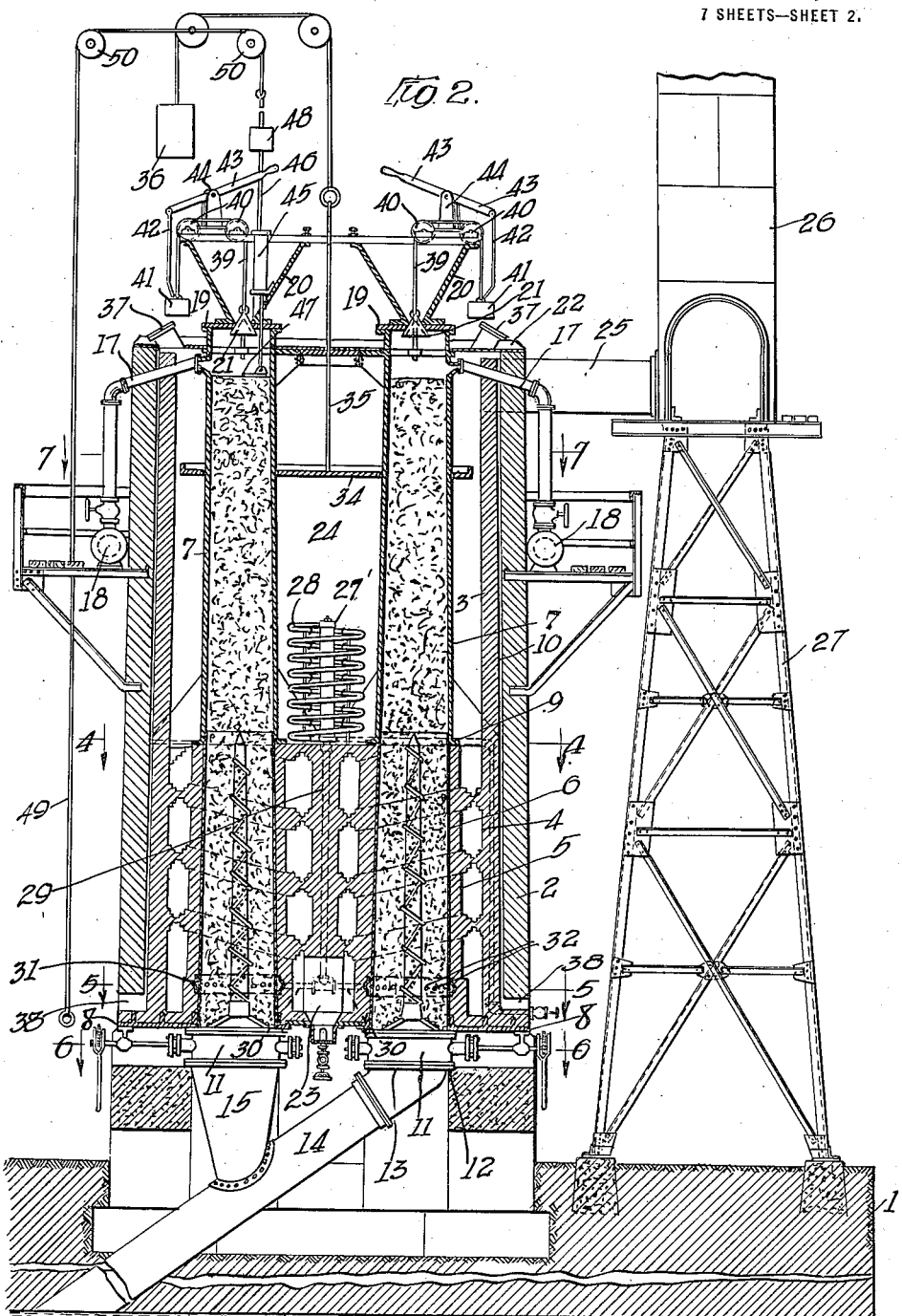

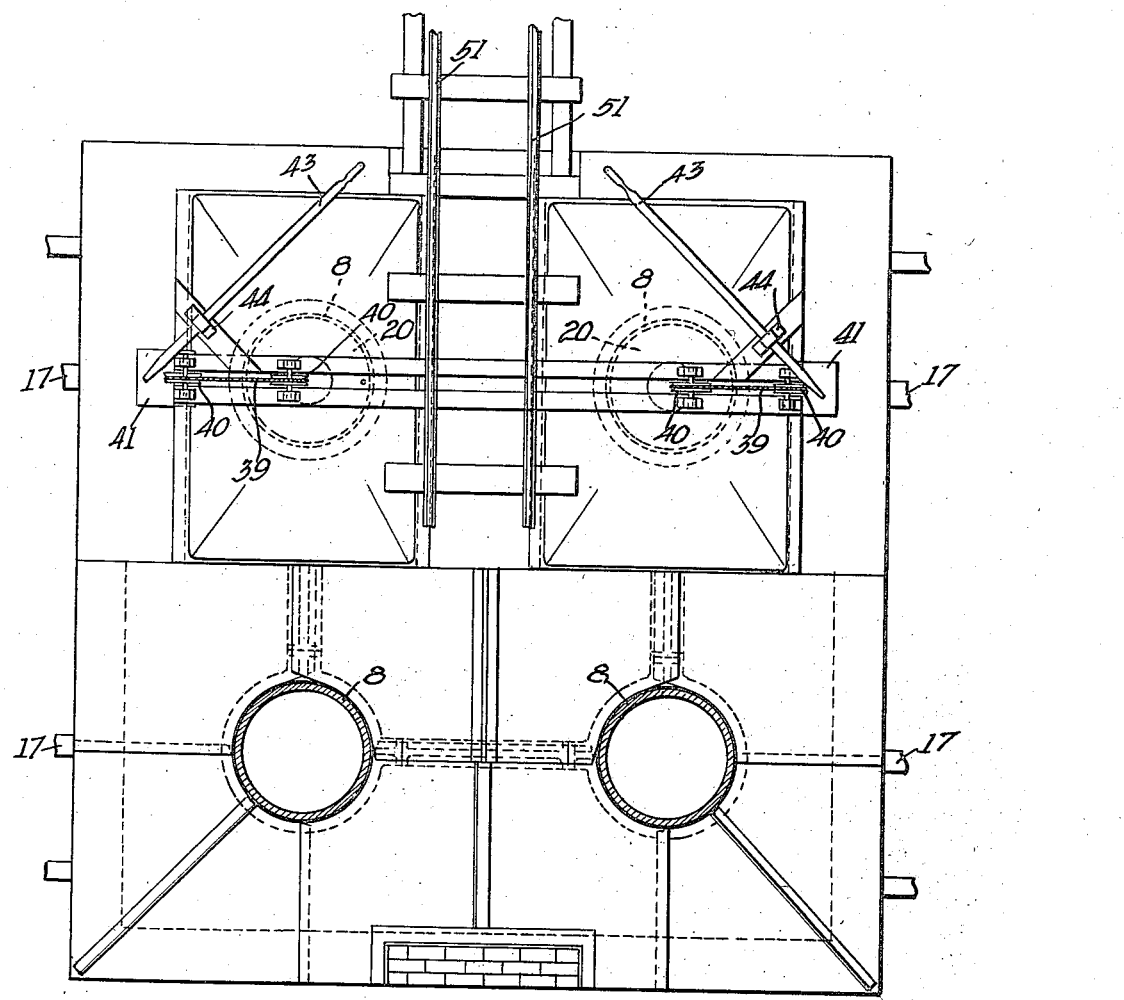

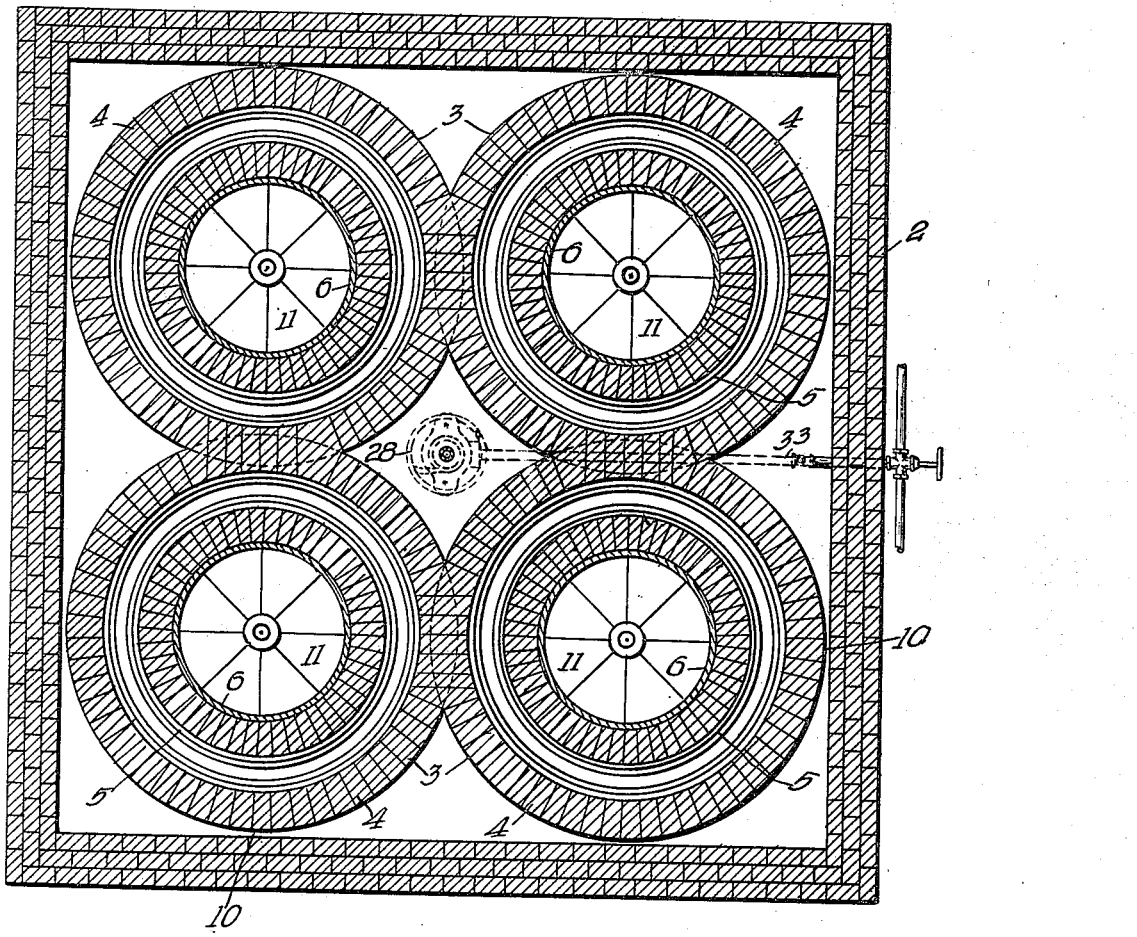

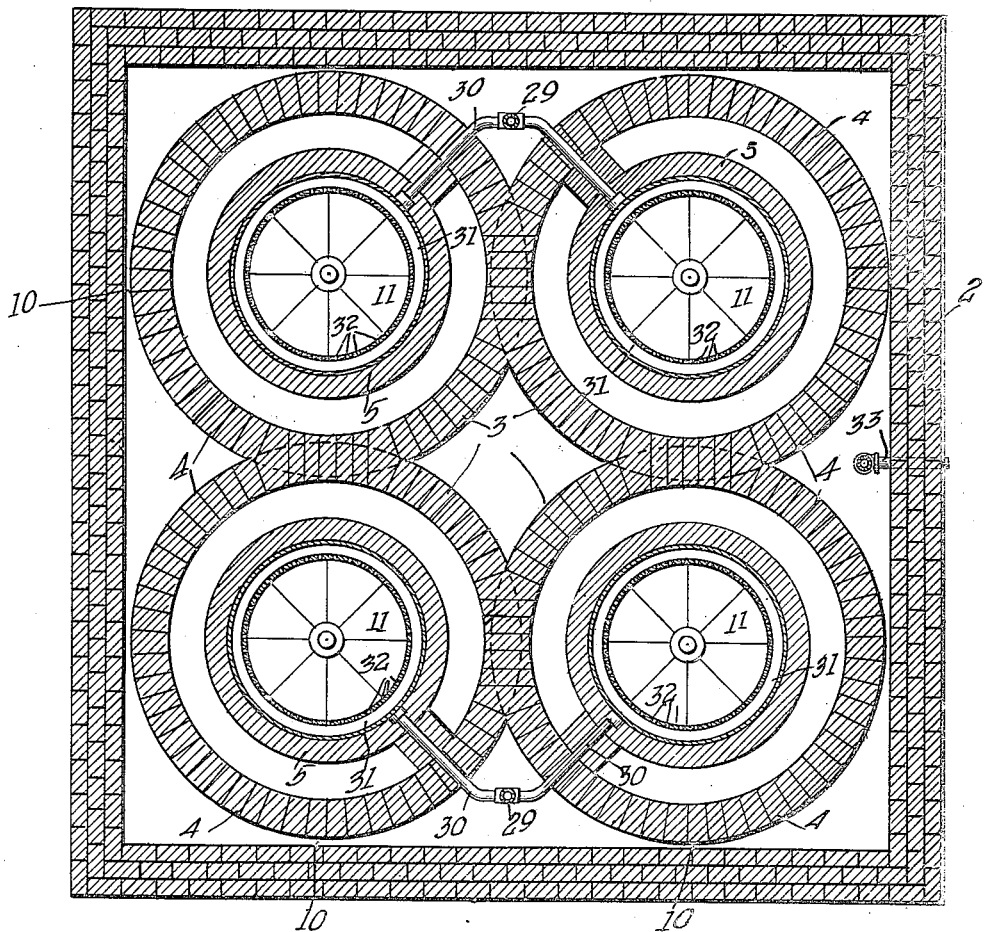

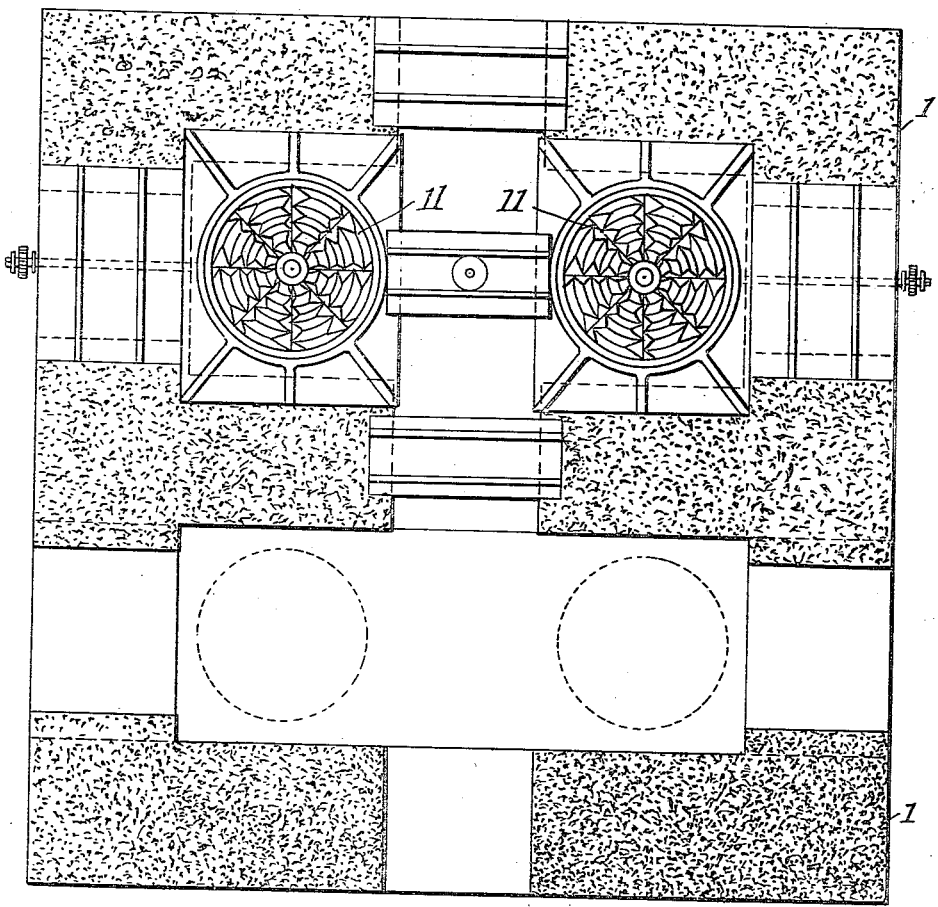

UNITED STATES PATENT OFFICE.

GOTTLIEB A. HEIMBUCHER, OF CHICAGO, ILLINOIS.

APPARATUS FOR TREATING OIL-BEARING SHALE.

1,421,228.  Specification of Letters Patent.  Patented June 27, 1922.

Application filed September 3, 1918. Serial No. 252,313.

*To all whom it may concern:*

Be it known that I, GOTTLIEB A. HEIMBUCHER, citizen of the United States, residing at Chicago, in the county of Cook and State of Illinois, have invented certain new and useful Improvements in Apparatus for Treating Oil-Bearing Shale; and I do hereby declare the following to be a full, clear, and exact description of the invention, such as will enable others skilled in the art to which it appertains to make and use the same.

This invention has for its object to provide an improved apparatus for extracting oil from oil-bearing shale, the particular object of the invention being to provide an apparatus of this character which may be continuously and uninterruptedly operated by removing shale from which the oil has been exhausted gradually from the bottoms of the retorts therefor, and adding fresh shale to take the place of that which has been removed whereby continuity of operation and maximum efficiency is effected.

In addition to the aforesaid main objects of the invention, there are other minor objects which will appear from the following specification.

The invention consists in the features of construction and combinations of parts hereinafter fully described and particularly claimed.

In the accompanying drawings illustrating a suitable embodiment of the invention:—

Figure 1 is a view in side elevation of a shale-treating apparatus constructed in accordance with the invention.

Fig. 2 is a vertical section of the same on the line 2—2 of Fig. 1.

Fig. 3 is a view partly in plan and partly in horizontal section of the same.

Figs. 4, 5, 6 and 7 are plan sections on the lines 4—4, 5—5, 6—6 and 7—7, respectively, of Fig. 2.

Fig. 8 is a fragmentary detail vertical section of a grate employed.

My said apparatus comprises a suitable foundation 1, providing suitable hollow spaces to contain parts of the apparatus hereinafter particularly described. The said foundation is preferably rectangular, and upon the same there is supported a rectangular wall or housing 2 of masonwork containing four retorts each of which is partially amassed in a hollow wall 3, provided with a plurality of helical passages or flues 4. Within the walls 3 there are mounted walls 5, each consisting of four segments of cylinders meeting at their edges so as together to completely surround each of the four retorts. Each of the latter comprises two sections or shells 6 and 7. The said walls 2 and 5 are supported upon a plate 8 mounted upon the foundation 1, and which is provided with flanged openings in which the lower ends of the shells 6 are received. The said shells 6 are slightly tapered so that they are of larger area at their lower than at their upper ends, which project slightly into the lower ends of the shells 7. The latter are provided at their lower ends with annular flanges 9 which are supported upon the hollow walls 3 and extend above the upper ends of the walls 2 and 5. The latter are separated from each other by a free space 10. The shells 6 are equipped in their lower ends with suitable shaker grates 11, and below the same are provided with annular flanges 12 to which the annular flanges 13 of discharge pipes 14 and 15 are bolted. The pipe 14 extends at an incline from one of the shells 6 through the hollow base or foundation, and projects at its lower end into a trough 16 containing water for sealing the discharge end of said pipe 14. The pipe 15 connects with the pipe 14 between its ends, as shown. There are two of said pipes 14 and 15 projecting into the trough 16, the latter being equipped with suitable means for removing the shale discharged from the pipes 14, but this is omitted from illustration.

Each of the shells 7 communicates at a point contiguous to its upper end with a pipe 17 leading to the pipe 18, in which the oil vapors are received and led to the condensing system (not shown) and then to suitable storage. Obviously, the pipe 18 may be connected with mains for maintaining some degree of vacuum therein, if desired.

The upper end of each of the shells 7 is closed by a cap 19 upon which the hopper 20 is mounted. The discharge mouth of the hopper communicates with an opening in the cap 19, the latter being surrounded by a seat for the valve 21 by means of which communication between the hopper 20 and the shell or retort 7 fed thereby is interrupted during intervals between feeds of shale from said hoppers into the retorts.

The space between the upper end of the wall 5 and a closure plate 22 mounted upon the upper end of the wall 2 constitutes a heating chamber 24 into which the hot products of combustion from a furnace 23 are discharged from the helical flues 4. The said heating chamber 24 communicates by means of the flue 25 with the chimney or stack 26 mounted upon a suitable supporting framework 27.

Disposed within said heating chamber 24, and substantially in the center thereof and supported upon the hollow walls 3, is a steam generator. The latter consists of a central stand-pipe 27' which is surrounded by a helically coiled pipe 28. The latter is connected with the upper end of the stand-pipe 27', and at its lower end is connected with pipes 29 each terminating in two branches 30 connecting with an annular steam-supply chamber 31 surrounding the lower end portion or shell 6 of each of the retorts and communicating with the interior of each retort through a series of perforations 32. The furnace 23 is adapted to burn oil or gas, and is provided with a suitable valve-controlled fuel-supply pipe 33 in the usual and well known manner. There are two of said furnaces 23, each of which is disposed between two of the retorts, and supplies the surrounding space which connects with the lower ends of two of the helical flues 4.

The hot products of combustion delivered from the discharge ends of the flues 4 into the heating chamber 24 are adapted to heat the shells 7 and contents thereof, and also to generate steam in the stand-pipe of the steam generator, and to super-heat such steam during the passage thereof through the coil 28 so that said steam will be delivered at a very high temperature into the lower ends of the retorts and will pass upwardly through the same and through the hottest body of shale contained therein. The said steam will carry with it oil and oil vapor extracted by the heat from the shale, and will pass with such vapor into the pipes 17 and 18. This super-heated steam liberates the volatile contents of the shale which consist of hydrocarbons and ammonia.

In order to regulate the temperature within the heating chamber 24, I provide a plate 34 which is suspended from the rod 35 and which is counter-balanced by means of a weight 36 in a well-known manner. Said plate is of substantially the cross-sectional dimensions of the chamber 24, and is provided with suitable openings through which the shells 8 project. Said plate, when disposed below the lower end of the flue 25, will obviously restrict the free passage of the products of combustion into said flue and into the stack 26, and will further cause that portion of the shell disposed below said plate 24 to be heated to a far higher degree than the body of shale disposed in said retorts above said plate; it being desirable to effect a gradual heating of the freshly introduced shale for the more efficient extraction of oil therefrom. The temperature, or approximate temperature, of the shells 8 and contents is ascertained through the observation tubes 37 mounted in the plate 22, such temperature being determined by the color to which the shells 7 are heated, as, for example, a dull or a bright red.

The space 10 between the walls 2 and 5 constitute a continuous vertical passage for cold air entering through the openings 38, said air being delivered into the top of the heating chamber 24 and into the space above the plate 34 where it mixes with the hot products of combustion and is discharged through the stack 26. The air passing through said space serves primarily to maintain the walls 2 and 5 relatively cool.

The valves 21 are suspended from cords or cables 39 which are trained over idlers 40 and carry counterweights 41. The said counter-weights 41 are connected by means of cords 42 with the ends of levers 43 pivoted between their ends on projections 44 carried by the upper ends of the hoppers. Any one of said levers may be turned on its pivot to raise the counter-weight 41, thereby causing the valve 21 to open by gravity, thus permitting shale contained in the hopper 20 controlled by said valve to pass into the retort. By releasing the lever, the valve 21 will automatically close, whereupon the hopper may be refilled.

Mounted in each of the hoppers is a tubular guide 45 through which a weighted rod 46, carrying a foot-plate 47, projects into the retort. The foot-plate 47 is adapted to rest upon the shale contained in said retort and the position of the weight 48 carried by said rod will indicate to the operator the level of the shale in said retort. Said rod is adapted to be raised by drawing on the cord 49 trained over the idlers 50 and connected at its other end with said rod 46. Said plate is adapted to be raised either before or after each projection of shale into the retort so as to subsequently rest upon the top of the pile. The operator is thus enabled to know at all times which of the retorts requires to be charged with a fresh batch of the material to be treated.

The shale is brought to the hoppers in cars adapted to travel on the rail 51 shown in Fig. 3, which rails are suitably supported upon the top plate 22 and also upon a suitable frame-work similar to the frame-work 27, as will be obvious.

In order that exhausted shale may be readily discharged from the retorts, and so that all of the shale disposed in the lower portions of the retorts and which is most densely packed may offer no undue resistance to the passage of super-heated steam, vapors and gases into the upper portions of the retorts, I prefer to employ shaker grates 52 mounted to rotate or oscillate on a vertical axis. Each of said grates is supported adjacent its peripheral edge upon the housing member 53, and is equipped with a bevel gear member 54 meshing with a pinion on the shaft 55. The grate-surface is preferably so made as to provide a series of teeth adapted to cut and scrape the shale from the bottom of the mass. Rising from the center of the grate is a slightly tapered tube 56 which is radially perforated and is provided on its outer surface with a preferably helical rib 57 which is adapted to stir up and loosen the body of the shale during periods of operation of the grate, so as to enable gases and vapors to readily pass therethrough into the upper part of the retort.

I claim as my invention:

1. Apparatus for the purpose set forth including a furnace, a combustion chamber in the lower end thereof, a plurality of retorts mounted within the furnace above the combustion chamber, a wall having helical flues surrounding each of said retorts at its lower end portion, said walls being spaced from the outer wall of the furnace, segmental walls meeting at their ends and spaced from the outer wall of the furnace partially surrounding each of the retorts at the upper end portions thereof, the space enclosed by said segmental walls forming a heating chamber connected by said helical flues with the combustion chamber, and a stack connected with said heating chamber.

2. Apparatus for the purpose set forth including a furnace, a combustion chamber in the lower end thereof, a plurality of retorts mounted within the furnace above the combustion chamber, a wall having helical flues surrounding each of said retorts at its lower end portion, said walls being spaced from the outer wall of the furnace, segmental walls meeting at their ends and spaced from the outer wall of the furnace partially surrounding each of the retorts at the upper end portions thereof, the space enclosed by said segmental walls forming a heating chamber connected by said helical flues with the combustion chamber, and a stack connected with said heating chamber, a steam generator mounted in said heating chamber, and pipes connecting the same with the retorts at their lower ends.

3. Apparatus for the purpose set forth including a furnace, a combustion chamber in the lower end thereof, a plurality of retorts mounted within the furnace above the combustion chamber, a wall having helical flues surrounding each of said retorts at its lower end portion, said walls being spaced from the outer wall of the furnace, segmental walls meeting at their ends and spaced from the outer wall of the furnace partially surrounding each of the retorts at the upper end portions thereof, the space enclosed by said segmental walls forming a heating chamber connected by said helical flues with the combustion chamber, and a stack connected with said heating chamber, means for admitting cool air to the space between the heating chamber and the outer wall of the furnace and to the upper end of the heating chamber.

4. Apparatus for the purpose set forth including a furnace, a combustion chamber in the lower end thereof, a plurality of retorts mounted within the furnace above the combustion chamber, a wall having helical flues surrounding each of said retorts at its lower end portion, said walls being spaced from the outer wall of the furnace, segmental walls meeting at their ends and spaced from the outer wall of the furnace partially surrounding each of the retorts at the upper end portions thereof, the space enclosed by said segmental walls forming a heating chamber connected by said helical flues with the combustion chamber, and a stack connected with said heating chamber, means for admitting cool air to the space between the heating chamber and the outer wall of the furnace and to the upper end of the heating chamber, a steam generator mounted in said heating chamber, and pipes connecting the same with the retorts at their lower ends.

5. Apparatus for the purpose set forth including a furnace, a combustion chamber in the lower end thereof, a plurality of retorts mounted within the furnace above the combustion chamber, a wall having helical flues surrounding each of said retorts at its lower end portion, said walls being spaced from the outer wall of the furnace, segmental walls meeting at their ends and spaced from the outer wall of the furnace partially surrounding each of the retorts at the upper end portions thereof, the space enclosed by said segmental walls forming a heating chamber connected by said helical flues with the combustion chamber, and a stack connected with said heating chamber and a vertically movable baffle plate disposed in the heating chamber for determining the elevation limit of intense heating of the upper end portions of the retorts.

6. Apparatus for the purpose set forth including a furnace, a combustion chamber in the lower end thereof, a plurality of retorts mounted within the furnace above the combustion chamber, a wall having helical flues surrounding each of said retorts at its lower end portion, said walls being spaced from the outer wall of the furnace, segmental walls meeting at their ends and spaced from the outer wall of the furnace partially surrounding each of the retorts at the upper end portions thereof, the space enclosed by said segmental walls forming a heating chamber connected by said helical flues with the combustion chamber, and a stack connected with said heating chamber, means for admitting cool air to the space between the heating chamber and the outer wall of the furnace and to the upper end of the heating chamber, a steam generator mounted in said heating chamber, and pipes connecting the same with the retorts at their lower ends and a vertically movable baffle plate disposed in the heating chamber for determining the elevation limit of intense heating of the upper end portions of the retorts, 7. Apparatus of the kind specified including a furnace having a combustion chamber, in its lower end and a heating chamber in its upper end, a plurality of retorts disposed within said furnace and projecting from the top thereof, a stack connected with the heating chamber, retort encasing walls partially surrounding the upper ends thereof to a point contiguous to the top of the furnace and having helical flues therein completely surrounding the lower end portions of each of the retorts, the space enclosed by the first-named portions of said encasing walls constituting the heating chamber connected by means of said flues with the combustion chamber, said walls being spaced from the outer wall of the furnace to provide air flues for admitting cool air to the upper end of the heating chamber.

8. Apparatus of the kind specified including a furnace having a combustion chamber in its lower end and a heating chamber in its upper end, a plurality of retorts disposed within said furnace and projecting from the top thereof, a stack connected with the heating chamber, retort encasing walls partially surrounding the upper ends thereof to a point contiguous to the top of the furnace and having helical flues therein completely surrounding the lower end portions of each of the retorts, the space enclosed by the first-named portions of said encasing walls constituting the heating chamber connected by means of said flues with the combustion chamber, said walls being spaced from the outer wall of the furnace to provide air flues for admitting cool air to the upper end of the heating chamber, a steam generator mounted in the lower end of the heating chamber, and pipes connecting the same with the lower ends of the retorts.

9. Apparatus of the kind specified including a furnace having a combustion chamber in its lower end and a heating chamber in its upper end, a plurality of retorts disposed within said furnace and projecting from the top thereof, a stack connected with the heating chamber, retort encasing walls partially surrounding the upper ends thereof to a point contiguous to the top of the furnace and having helical flues therein completely surrounding the lower end portions of each of the retorts, the space enclosed by the first-named portions of said encasing walls constituting the heating chamber connected by means of said flues with the combustion chamber, said walls being spaced from the outer wall of the furnace to provide air flues for admitting cool air to the upper end of the heating chamber, a vertically movable baffle plate in the heating chamber for deflecting hot products of combustion to prevent heating of the portions of the retorts above the same to the same temperature as the portions disposed below the same.

10. Apparatus of the kind specified including a furnace having a combustion chamber in its lower end and a heating chamber in its upper end, a plurality of retorts disposed within said furnace and projecting from the top thereof, a stack connected with the heating chamber, retort encasing walls partially surrounding the upper ends thereof to a point contiguous to the top of the furnace and having helical flues therein completely surrounding the lower end portions of each of the retorts, the space enclosed by the first-named portions of said encasing walls constituting the heating chamber connected by means of said flues with the combustion chamber, said walls being spaced from the outer wall of the furnace to provide air flues for admitting cool air to the upper end of the heating chamber, a steam generator mounted in the lower end of the heating chamber, and pipes connecting the same with the lower ends of the retorts, a vertically movable baffle plate in the heating chamber for deflecting hot products of combustion to prevent heating of the portions of the retorts above the same to the same temperature as the portions disposed below the same.

11. In apparatus of the kind specified, retorts each provided in its lower end with a rotatable grate for supporting shale, a tapered perforated pipe projecting upwardly from the center of each grate, means on the exterior of each pipe for agitating the surrounding shale as said grate is rotated, and means manually operable from the exterior of each retort for actuating its grate.

12. In an apparatus of the kind specified, retorts each provided in its lower end with an inverted conical-shaped rotatable grate for supporting shale, teeth formed on the upper surface of the grates, a tapered perforated pipe projecting from the apex of each grate, means on the exterior of each pipe for agitating the surrounding shale as said grate is rotated, and means for agitating the grate.

GOTTLIEB A. HEIMBUCHER.